US011040840B1

(12) United States Patent
Hobbs

(10) Patent No.: US 11,040,840 B1
(45) Date of Patent: *Jun. 22, 2021

(54) APPARATUS AND METHOD FOR POSITIONING AND TILTING A DETACHABLE, ENCLOSED CARGO CONTAINER FOR USE ON A SEMI-TRAILER OR SIMILAR CARGO VEHICLE TO FACILITATE LOADING THEREOF

(71) Applicant: James Hobbs, Springville, TN (US)

(72) Inventor: James Hobbs, Springville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,562

(22) Filed: Feb. 26, 2021

Related U.S. Application Data

(63) Continuation of application No. 16/862,397, filed on Apr. 29, 2020, now Pat. No. 10,934,112.

(51) Int. Cl.
*B65G 67/04* (2006.01)
*B65G 67/24* (2006.01)

(52) U.S. Cl.
CPC .............. *B65G 67/24* (2013.01); *B65G 67/04* (2013.01)

(58) Field of Classification Search
CPC ........ B65G 67/48; B65G 67/50; B65G 67/54; B65G 67/36; B65G 67/34; B65G 67/32; B65G 67/30
See application file for complete search history.

(56) References Cited

U.S. PATENT DOCUMENTS

| | | | |
|---|---|---|---|
| 5,080,548 | A | 1/1992 | Bratlie |
| 5,509,723 | A | 4/1996 | Bratlie |
| 6,860,695 | B2 | 3/2005 | Chapman |
| 2005/0281652 | A1 | 12/2005 | Riley et al. |
| 2009/0317218 | A1 | 12/2009 | Phelps |
| 2012/0070257 | A1 | 3/2012 | Dunn |
| 2015/0037123 | A1 | 2/2015 | Hobbs |

FOREIGN PATENT DOCUMENTS

WO    WO2013008211    1/2013

*Primary Examiner* — Mark C Hageman
(74) *Attorney, Agent, or Firm* — Hulsey P.C.

(57) ABSTRACT

Disclosed is an apparatus for tilting a container for loading thereof. The apparatus includes a platform and a support frame being pivotally connected to the platform to move between a resting position and a loading position. The apparatus includes a gate operable to move between an open position and a closed position. The apparatus includes a pair of first actuating cylinders, each of the first actuating cylinders being pivotally supported with respect to the platform and fixedly connected to the support frame. The apparatus includes a pair of second actuating cylinders with each of the second actuating cylinders being pivotally connected to the platform and fixedly connected to the support frame. Herein the pair of first actuating cylinders are compressed and the pair of second actuating cylinders are extended to move the support frame from the resting position to the loading position.

17 Claims, 17 Drawing Sheets

APPARATUS AND METHOD FOR POSITIONING AND TILTING A DETACHABLE, ENCLOSED CARGO CONTAINER FOR USE ON A SEMI-TRAILER OR SIMILAR CARGO VEHICLE TO FACILITATE LOADING THEREOF

The present invention is a continuation of U.S. patent application Ser. No. 16/862,397, filed Apr. 29, 2020; all of which is incorporated herein by reference.

FIELD OF THE PRESENT DISCLOSURE

The present disclosure relates to apparatus and method for loading a cargo container and, more particularly, to an apparatus and method for positioning and tilting a detachable enclosed cargo container for use on a semi-trailer or similar cargo vehicle to facilitate loading thereof.

BACKGROUND OF THE DISCLOSURE

A semi-tractor-trailer truck is the combination of a tractor unit and one, or more, semi-trailers to carry freight. A semi-trailer attaches to the tractor with a type of hitch called a fifth-wheel. It is variously known as a transport truck, semi-trailer truck, tractor-trailer truck, semi-tractor truck, semi-truck, trailer truck, tractor truck transfer truck, articulated truck, artic, single truck, semi-tractor-trailer, semi-trailer, tractor-trailer, semi-tractor, semi, trailer, tractor, big rig, eighteen-wheeler and articulated lorry, depending on the country. A critical aspect of using semi-tractor-trailer trucks includes efficient, reliable, and safe ways to load cargo containers.

In modern commerce, cargo containers are used in various industries and services for a plurality of purposes. Standard containers are typically metallic cubical storage unit with two hinged doors for access on one side. To utilise a container efficiently, as much of the cubic volume of the container should be filled. This can be problematic when particulate materials or large numbers of small articles are to be loaded through the door of the container. This can result in heaps or piles of material collecting inside the container which do not easily reach the container ceiling and hence does not maximise the use of the whole volume of the container.

For loading such materials, it is preferable to tilt the container to facilitate a gravity fed loading operation. Nowadays, semi-automated or automated apparatuses are used for loading goods to the containers. These apparatuses typically tilt the container and load goods such as grains inside it. For this purpose, conventionally, the containers are demounted from the trailer and then mounted on the tilting mechanism of the apparatus for the purpose of loading goods. Once the container is loaded, it has to be mounted back on the trailer, thus making it a complex and cumbersome process. Moreover, in certain cases, the goods can be such that the mass within the container is unevenly distributed. Hence, the mass distribution of the loaded container is quite different from the initial empty container. This causes issues in the alignment of the container during the process of demounting and mounting to the trailer. Moreover, known apparatuses employ large mechanical structures and complex mechanisms. Therefore, in case of failure of any mechanism, such apparatus may collapse and cause severe safety hazards to workers present at the site.

Known methods and systems for portable tilting container loading may be observed in United States Patent Application Publication No. US20050281652A1 (the "'652 Publication"), entitled "Portable Tilting Container Loader," wherein a portable tipping apparatus for tipping a shipping container for loading includes a base adapted to rest upon a supporting surface and a tipping platform are mounted on the base with fasteners for securing the container thereto. Actuators tilt the tipping platform to raise an opening end of the container for loading the container with bulk product. Four fittings fixed to the base in a rectangular array are provided to receive twist locks for securing the apparatus in transport. A door-control device mounted on the tipping platform is operable to open or close the doors of the container at any tilted position of the tipping platform and includes an elongate arm pivoted by an actuator. A block sliding longitudinally on the arm is fixed by a clamp to the door of the container.

The loader of the '652 Publication requires that the container be placed on the apparatus in a horizontal position using either a fork lift or crane. The container, therefore, is secured to the apparatus using twist locks that are inserted into the container corner cubes. A limitation of this configuration is that the container cannot be mounted on a trailer while it is being raised to a vertical position for loading.

The apparatus of the '652 Publication includes a mechanism for opening and closing the doors on the container at any position during the tilting operation. It also includes a mechanism for raising a work/access platform from a horizontal to vertical position. This allows the entire apparatus to be placed in a compact configuration that makes movement to different work sites possible. The primary tilt cylinders of the '652 Publication have a lower mount located between longitudinal beams that enable them to be recessed between the beams while in the apparatus is in the horizontal position. This is similar to how a cylinder on a dump truck is configured.

A key limitation of the subject matter of the '652 Publication is that it that Portable Tilting Container Loader provide no mechanism for tilting the container while mounted on a trailer.

Another "Container Loading Method and Apparatus" appears in United States Patent Application No. 2012/0070257A1 (the "'257 Publication"). There a method of loading a shipping container is described comprising moving the container from a horizontal transport condition to a vertical loading condition, and loading the container in the loading condition. An apparatus for carrying out the method is also described. The apparatus includes a base frame, a support frame and an actuator. According to a first aspect of the present invention, there is provided container loading apparatus for loading a shipping container, the apparatus including a base frame, a support frame for supporting a container, a mounting for mounting the support frame to the base frame, one or more securing devices for securing the container to the support frame, and an actuator which is operable to move the support frame between a first condition and a second condition.

Thus in use, a container secured to the support frame is movable between a transport condition corresponding to the first condition and a loading condition corresponding to the second condition.

This apparatus of the '257 Publication provides a hydraulically actuated mechanism for tilting a container to a vertical position and a second hydraulically actuated mechanism to facilitate raising the container so that it can be moved to an intermediate position. This movement facilitates removing the container from a trailer used to insert the container into the apparatus. This second mechanism overcomes a fundamental problem that exists for the apparatus contained the '652 Publication.

Access to the open end of the container to close/open the container doors is provided by a work platform that is raised and lowered as the container is raised and lowered. This allows the apparatus to be folded into a compact configuration to facilitate movement.

In the '257 Publication, a container is secured to the apparatus using flexible securing members such as wire ropes, chains or cables. However, this configuration suffers from the limitation that the ratchet chains secure only the container to the actuated mechanism for tilting the container.

Still another device for tilting and emptying of containers appears in PCT Publication WO2013008211A1 (the "'211 Publication"), entitled "Container Tilting Apparatus and Method." That disclosure concerns a container tilting apparatus for loading or unloading containers. The apparatus includes a base on which a wheeled trailer on which a container is mounted at a generally horizontal transportation attitude that can be supported. The base is locatable on a supporting surface. The apparatus further includes a container handling means on the base for engaging the container and tilting it to an upright, loading attitude, at which attitude of the container material can be introduced into the container through an end thereof. Thereafter, the apparatus is configured to return the container to the transportation attitude. In the preferred embodiment the container handling means is configured to tilt the container from its transportation attitude to its loading attitude and back to its transportation attitude while still mounted on the trailer.

The '211 Publication also concerns a method of tilting a container using a container tiling apparatus wherein a truck and trailer mounted container are driven onto the base unit. There is no mechanism in the embodiment shown in the patent for the apparatus to tilt the container and trailer. The apparatus does not have sufficient clearance between the trailer and base to rotate both the chassis and trailer while connected. There is also no mention of a means by which the trailer and container would be connected during such an operation. Corner cubes are used to connect a container to a trailer. Trailers are not designed to be suspended from the corner cubes of containers and the trailer would fail under this type of operation.

Therefore, in the '211 Publication, the container must be removed from the trailer prior to being tilted by the apparatus. The apparatus connects to the top and bottom corners on both sides of the container. The truck then pulls the trailer out from under the apparatus and off of the base with the container held by the apparatus.

The problem with this '211 Publication mode of operation is that there is no mechanism for raising the apparatus and container vertically to facilitate moving the trailer out from under it. The total weight of the container will rest on the trailer while the trailer is being removed from beneath it. This will result in damage to either the trailer or container while the trailer is pulled out from under it.

After the container has been filled and rotated from a near vertical to a horizontal position the trailer must be backed underneath the container. The now loaded container will weigh more than it did when empty and the additional weight will cause the apparatus to flex and hold the container at a lower vertical height than it did when the container was empty. It will be nearly impossible to put the trailer underneath the container without the ability to vertically lift the apparatus relative to the base unit the trailer and truck are required to sit on.

The apparatus of the '211 Publication latches onto the container at the lower front and upper rear corners. It does not use the corner cubes built into the container for lifting purposes. Therefore, it must push on the sides, front or rear of the container to develop sufficient force to hold the container using friction.

The '211 Publication discusses an embodiment in which the apparatus uses pins that allow the apparatus to hold the container without relying on friction. However, as drawn, there are no holes in the container in the vicinity of the attachment points to insert the pins. Furthermore, containers are made out of relatively thin sheets of steel that does not lend itself to having load bearing holes simply drilled in it. Thus, a specially modified container would be required to implement this embodiment. This would eliminate all standard commercial containers from being used with this system. In the event that pins are used to connect to the container, failure of a single pin would cause the container to be dropped.

Therefore, in light of the foregoing discussion, there exists a need to overcome aforementioned limitations associated with the existing apparatuses for loading goods in containers.

BRIEF SUMMARY OF THE DISCLOSURE

The subject matter of the present disclosure includes significant unique features and functions. These include a dual cylinder system for controlling system operation. The presently disclosed system and method include a load transfer mechanism between the two cylinders, specifically a slotted upper cylinder mount. Yet another novel aspect of the present disclosure includes a door closing system that provides a hydraulic system for closing the trailer bed doors. The present disclosure further includes an A-frame system for safe and reliable operations. Furthermore, the present disclosure includes a push cylinder lower mount providing the novel and beneficial functions and features herein described and claimed.

Still a further important and differentiating aspect of the present disclosure includes a loader that operates better and more safely than the known systems. With known loaders, if a pin lock fails or a cylinder fails, the unit falls and quite possibly in an unsafe configuration.

The system and method of the present disclosure, in contrast, returns to grade level and does so in a safe and reliable manner. The method and system include a "sudden fall protection" mechanism that is installed in the operating cylinders. No known method or system provides such user and/or cargo protection. With the presently disclosed platform mounted to the concrete and container restrained by the large cross bar there is no danger of a failure.

In an aspect, an apparatus for tilting a container for loading thereof is provided. The apparatus includes a platform and a support frame having a front end and a rear end, the support frame being pivotally connected to the platform at the front end thereof to move between a resting position and a loading position, the support frame being generally parallel to the platform and adapted to receive a trailer with the container mounted thereon in the resting position thereof, and the support frame being disposed at an angle with respect to the platform to tilt the received trailer in the loading position thereof.

The presently disclosed method and system provide a gate pivotally connected to the support frame proximal to the front end thereof, the gate being operable to move between an open position and a closed position, with the gate being adapted to allow for receiving the trailer on the support frame in the open position thereof and to support the trailer on the support frame in the closed position thereof. The apparatus includes a pair of first actuating cylinders with each of the first actuating cylinders having a first end and a second end, each of the first actuating cylinders being pivotally supported with respect to the platform from the corresponding first end and fixedly connected to the support frame from the corresponding second end, proximal to the front end of the support frame.

The apparatus includes a pair of second actuating cylinders with each of the second actuating cylinders having a first end and a second end, each of the second actuating cylinders being pivotally connected to the platform from the corresponding first end and fixedly connected to the support frame from the corresponding second end, proximal to the rear end of the support frame. Herein the pair of first actuating cylinders are compressed and the pair of second actuating cylinders are extended to move the support frame from the resting position to the loading position.

In one or more embodiments, the apparatus further including a pair of pivoting arms with each of the pivoting arms having a first end and a second end, each of the pivoting arms being pivotally connected to the platform from the corresponding first end proximal to the front end of the support frame and pivotally connected to one of the pair of first actuating cylinders from the corresponding second end at the first end of the respective first actuating cylinder.

The presently disclosed method and system further provide a support frame that includes a pair of first side beams extending vertically from the support frame proximal to the front end thereof, and wherein each of the first actuating cylinders is fixedly connected at the respective second end to one of the pair of first side beams.

In some embodiments, the gate has a constrained end and a free end, the gate being pivotally connected to one of the pair of first side beams at the constrained end thereof, such that the free end of the gate is received at other first side beam of the pair of first side beams when the gate is in the closed position thereof.

With the present method and system, the support frame includes a pair of second side beams extending vertically from the support frame proximal to the rear end thereof, and wherein each of the second actuating cylinders is fixedly connected at the respective second end to one of the pair of second side beams.

In one or more embodiments, the apparatus further including a securing member configured to lash the trailer to the support frame. The securing member includes one or more of chain ratchets, ropes, wires, cables or a combination thereof. The apparatus further includes an accessing arrangement to provide access to a door side of the container when the support frame is in the loading position thereof.

Here, the accessing arrangement includes a ladder structure having a ramp and arranged on the platform; and a walkway structure having a ramp and provided at the rear end of the support frame. Herein, the support frame is in the loading position thereof, the ramp of the ladder structure and the ramp of the walk away structure are substantially aligned to form an access platform for an operator to stand thereat and access the door side of the container.

In one or more embodiments, the apparatus further including a ramp panel provided with the walkway structure to allow the operator standing thereon to get a closer access to the door side of the container.

In some configurations, the support frame is disposed at the angle in the range of 75 to 85 degrees with respect to the platform in the loading position thereof.

In one or more embodiments, each of the pair of second side beams is substantially A-shaped.

In another aspect, a method for operating the apparatus for loading of the container is provided. The method includes receiving the trailer with the container mounted thereon, engaged to and driven by a vehicle in the reverse direction, onto the support frame. The method includes moving the gate to the closed position thereof such that the trailer is supported on the support frame, with the container abutting the gate, when the vehicle is moved backward on the platform with the trailer disengaged there from. The method includes compressing the pair of first actuating cylinders and extending the pair of second actuating cylinders to move the support frame from the resting position to the loading position thereof to be disposed at an angle with respect to the platform with the received trailer being tilted. The method includes providing access to a door side of the container when the support frame is in the loading position thereof for performing loading of the container. The method includes extending the pair of first actuating cylinders and compressing the pair of second actuating cylinders to move the support frame from the loading position back to the resting position thereof.

For selected embodiments, the method further includes moving the gate to the open position thereof such that the trailer with the container is allowed to be removed from the support frame, when the vehicle is moved forward on the platform with the trailer engaged therewith.

The method further includes lashing the trailer to the support frame when received thereon; and unlashing the trailer from the support frame to enable the trailer with the container to be removed from the support frame, when the vehicle is driven in the forward direction with the trailer engaged therewith.

In one or more embodiments, the method further includes opening a door of the container when the support frame is in the resting position thereof; and closing the door of the container when the support frame is in the loading position thereof after the loading of the container has been performed.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features believed characteristic of the disclosed subject matter will be set forth in any claims that are filed later. The disclosed subject matter itself, however, as well as the preferred mode of use, further objectives, and advantages thereof, will best be understood by reference to the following detailed description of an illustrative embodiment when read in conjunction with the accompany drawings, wherein:

Figure 1:
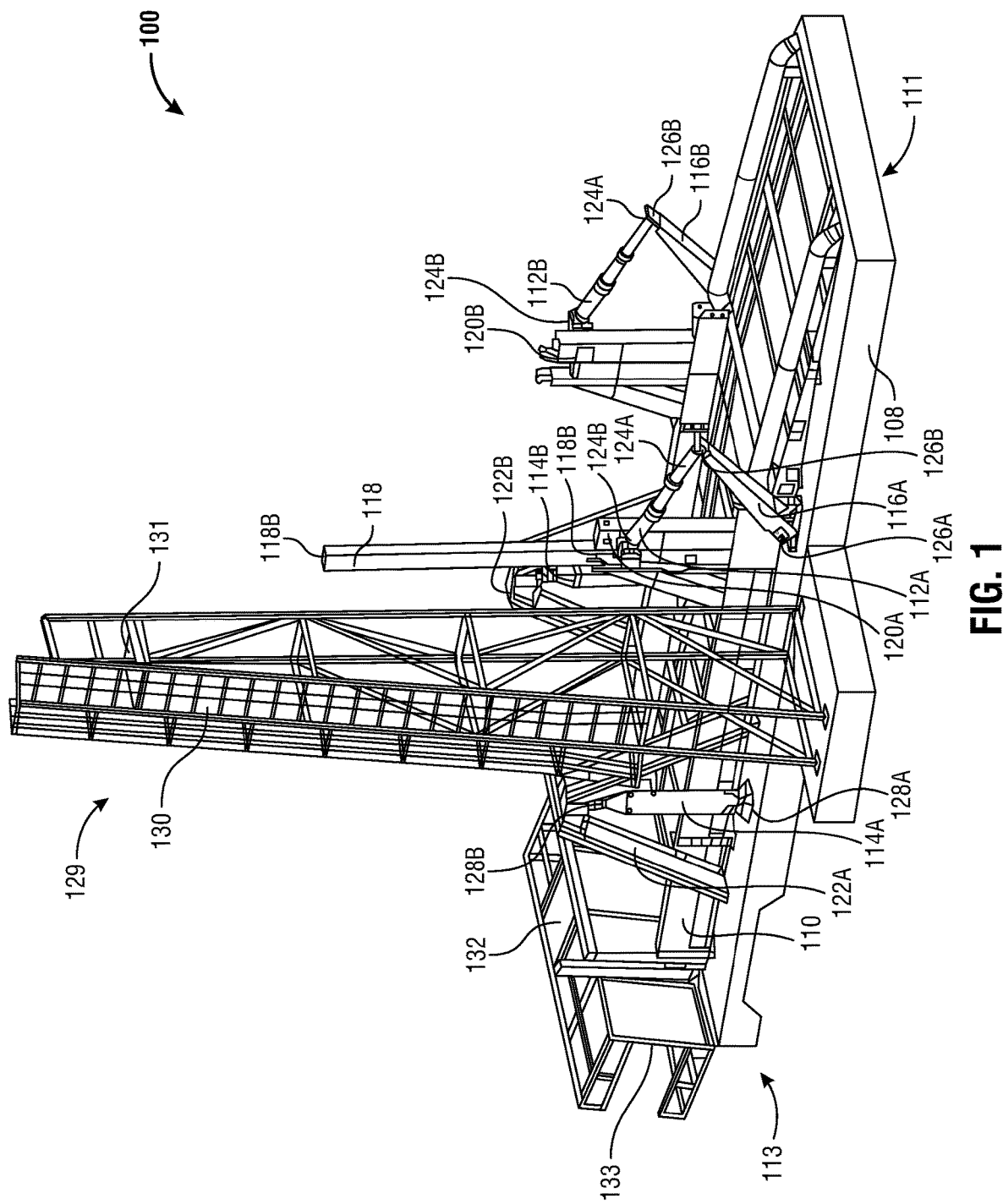
Figure 2:
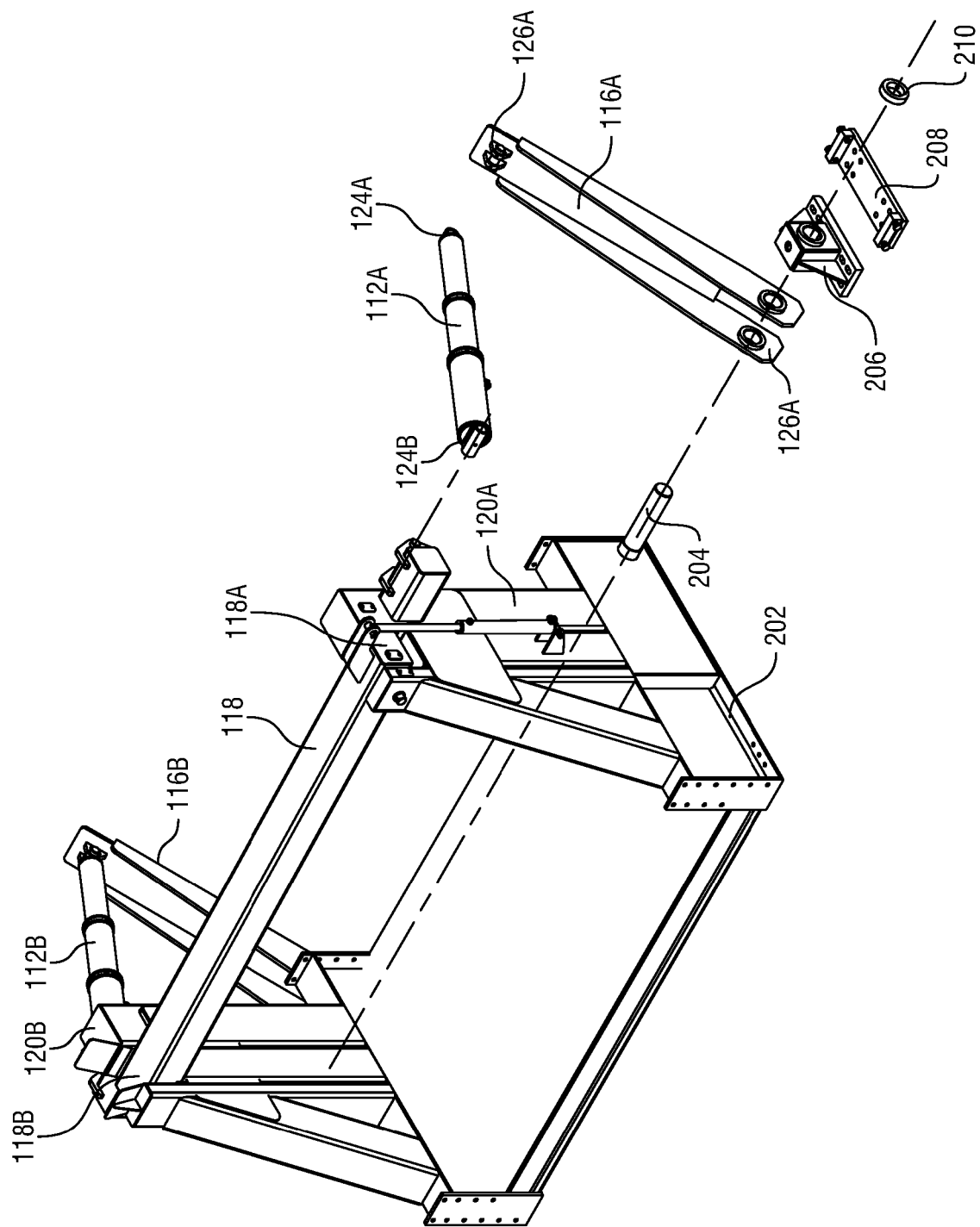
Figure 3:
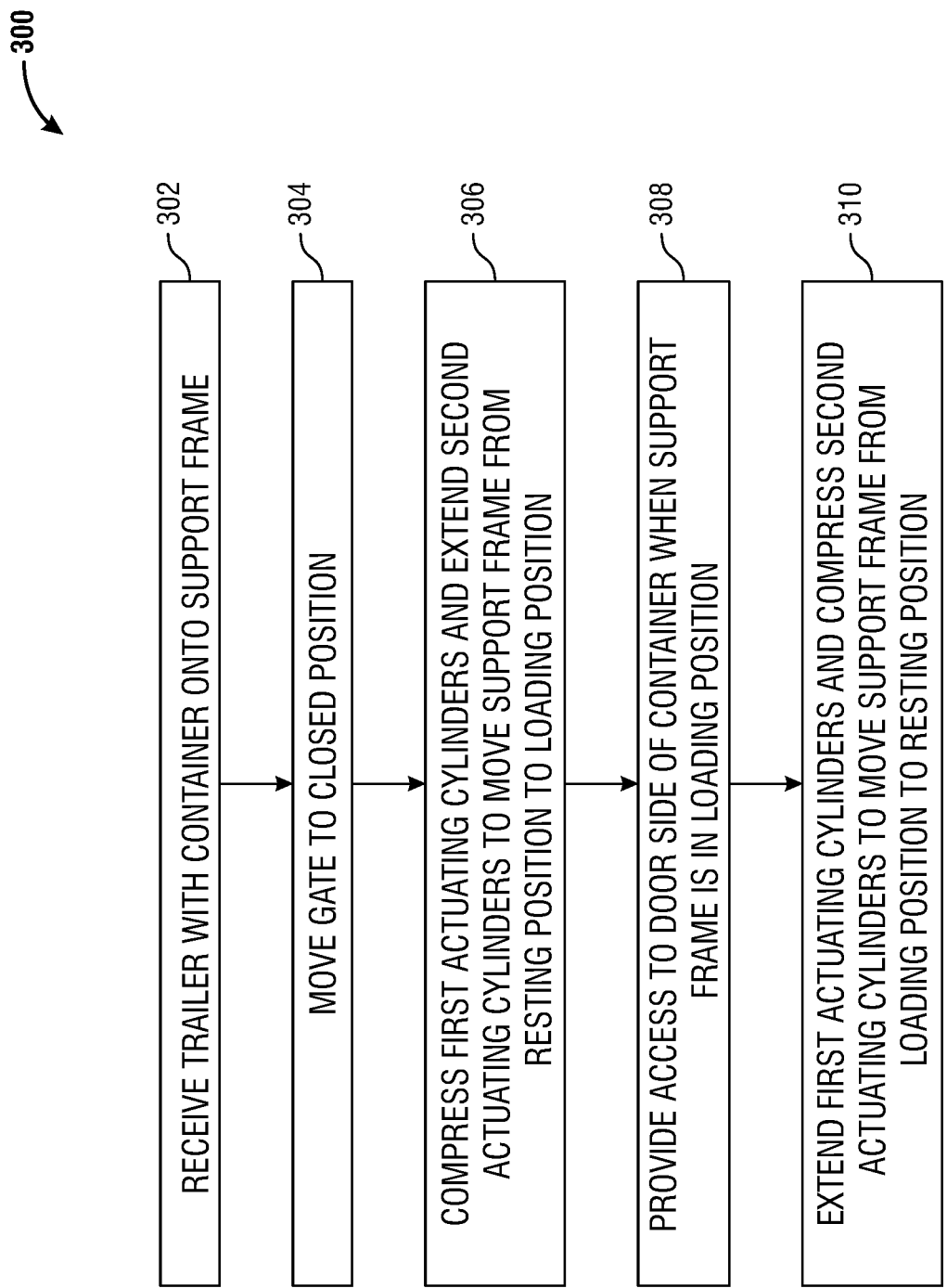

Having thus described the invention in general terms, reference will now be made to the accompanying drawings, which are not necessarily drawn to scale, and wherein:

FIG. 1 illustrates a diagrammatic perspective view of an apparatus for tilting a container and loading thereof, in accordance with an embodiment of the present disclosure;

FIG. 2 illustrates a diagrammatic exploded view of a section of the apparatus of FIG. 1 depicting arrangement of a pair of first actuating cylinders and a gate therein, in accordance with an embodiment of the present disclosure;

FIG. 3 is a flowchart listing steps of a method for operating the apparatus of FIG. 1 for loading of the container, in accordance with an embodiment of the present disclosure; and FIGS. 4 to 17 depict various stages involved in loading of the container using the apparatus of FIG. 1, in accordance with various embodiments of the present disclosure.

DETAILED DESCRIPTION OF THE INVENTION

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments.

Certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric centre of the personalized air conditioning system and designated parts thereof. The words "first", and "second", are only used to represent a particular entity, and are not used to depict any specific order. The terminology includes the words above specifically mentioned, derivatives thereof and words of similar import.

The present invention provides an apparatus for tilting a container and loading thereof. The apparatus of the present invention is adapted to engage the container while supported on the trailer, once the trailer has been disengaged from a truck or a towing vehicle. Herein, the truck or the towing vehicle can be used to bring the empty container to the apparatus and to receive the loaded container out of the apparatus. In the apparatus, the container is tilted for performing loading operation. The present invention can be used to quickly and safely tilt a container to a high angle of inclination. This may, in turn, result in an efficient gravity-fed loading operation, allowing most of the internal volume of the container to be filled with particulate materials.

Figure 4:
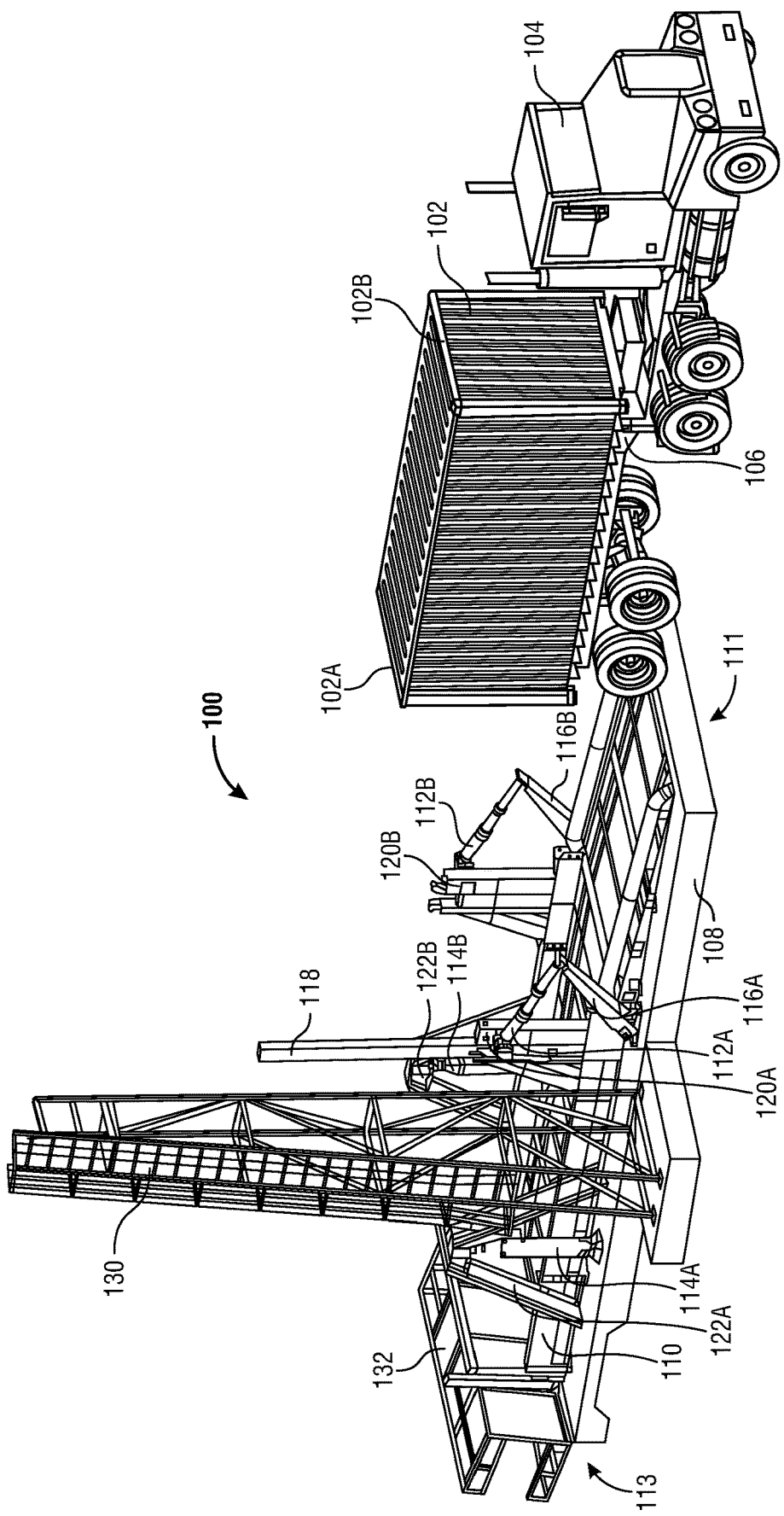

Referring to FIG. 1, illustrated is a diagrammatic illustration of an apparatus 100 for tilting a container and loading thereof, in accordance with an embodiment of the present disclosure. As depicted in FIG. 4, for the purposes of the present disclosure, a towing vehicle 104 engaged to a trailer 106 with the container 102 mounted thereon may be implemented, for bringing the container 102 to the apparatus 100 and to receive the container 102 out of the apparatus 100, once loaded. As shown in FIG. 1, the apparatus 100 includes a platform 108, a support frame 110, a pair of first actuating cylinders 112A and 112B, a pair of second actuating cylinders 114A and 114B, a pair of pivoting arms 116A and 116B, a gate 118, a pair of first side beams 120A and 120B, and a pair of second side beams 122A and 122B. These components of the apparatus 100 and their relative arrangement for achieving the purposes of the present disclosure have been explained in the proceeding paragraphs.

Throughout the present disclosure, the term "container" as used herein refers to enclosed units for shipment, storage, and handling. For the purpose of present disclosure, the container 102 is a rectangular storage unit, usually fabricated of metallic sheets, used for storing and transporting materials from one place to another. Further, the term "trailer" as used herein refers to a transporting unit having wheels over which the container 102 is mounted. Notably, the trailer 104 cannot move independently and requires a truck 106 or a towing vehicle (sometimes, simply, referred to as vehicle 106 hereinafter) to move the trailer 104 from one location to another. It will be appreciated that both the trailer 104 and container 102 are driven on the apparatus 100 via the towing vehicle 106, for the purpose of titling and loading the container 102. Beneficially, the disclosed apparatus 100 does not require the container 102 to be removed from the trailer 104 and can the trailer 104 with the container 102 mounted thereon can be placed directly on the apparatus 100, in contrast to some known conventional loading mechanisms which require the container to be disengaged from the trailer.

The platform 108 forms a planar base for the apparatus 100. Herein, the term "platform" refers to a base area that is adapted to bear an entire load of other elements of the apparatus 100. In the present examples, the platform 108 supports most of the elements of the apparatus 100, including the support frame 110, the pair of first actuating cylinders 112A and 112B, the pair of second actuating cylinders 114A and 114B, the pair of pivoting arms 116A and 116B, the gate 118, the pair of first side beams 120A and 120B, and the pair of second side beams 122A and 122B. In an example, the platform 108 is a dedicated area on the ground at the site of loading over which the said other elements of the apparatus 100 are arranged. In another example, the platform 108 is a flat concrete structure or the like over which the said other elements of the apparatus 100 are arranged. The platform 108 is designed to withstand the weight of the vehicle 106 along with trailer 104 and the container 102 thereon, along with supporting the said other elements of the apparatus 100.

The support frame 110, in the apparatus 100, has a front end 111 and a rear end 113. Herein, the term "support frame" 110 refers to a frame structure, rectangular in one or more examples, having a ladder type design. Such ladder type design for the support frame 110 helps to reduce the weight of the support frame 110, which would be beneficial since the support frame 110 has to be lifted (as discussed later in the description) to cause tilting of the container 102 for performing loading operation. As may be seen, the support frame 110 includes supporting rails on three sides of the support frame 110 including the rear end 113 and two parallel lateral sides thereof, thereby defining a loading space for the trailer 106 to be driven onto the support frame 110. The front end 111 of the support frame 110 is left open in order for receiving the trailer 106 along with the container 102 in the loading space. It will be appreciated a shape and size of the loading space in the support frame 110 is defined to be conveniently receive a particular shape and size of the trailer 106 and the container 102 mounted thereon.

The support frame 110 is generally parallel to the platform 108 and adapted to receive the trailer 106 with the container 102 mounted thereon in the resting position thereof. Herein, the trailer 106 along with the container 102 is driven into the loading space from the front end 111 of the support frame 110. Notably, the support frame 110 is pivotally connected to the platform 108 at the front end 111 thereof to move between a resting position and a loading position. Herein, the resting position is a horizontal position, i.e., a position when the support frame 110 is parallel to the platform 108. That is, the support frame 110 is in the resting position when an angle between a plane of the support frame 110 and the platform 108 is 0 degrees. Further, the loading position is an inclined position i.e. a position when the support frame 110 is at a certain angle with respect to the platform 108. The support frame 110 may be disposed at an angle with respect to the platform 108 to tilt the received trailer in the loading position thereof.

It will be appreciated that loading of contents such as materials, goods, liquids, or any other shipment is performed when the support frame 110 is in the loading position thereof. According to embodiments of the present disclosure, the support frame 110 is disposed at the angle in the range of 75 to 85 degrees with respect to the platform 108 in the loading position thereof.

Also, as may be seen in FIG. 1, the pair of first side beams 120A and 120B extend vertically from the support frame 110 proximal to the front end 111 thereof. And, the pair of second side beams 122A and 122B extend vertically from the support frame 110 proximal to the rear end 113 thereof. In an embodiment, as shown in the illustrated examples, each of the pair of second side beams 122A and 122B is substantially "A"-shaped (as better shown in FIG. 2). Further, in some examples, the pair of first side beams 120A and 120B generally has an "A" shape (as better shown in FIG. 1). It will be appreciated that the pair of first side beams 120A and 120B and the pair of second side beams 122A and 122B provide support to the respective set of cylinders and help in movement of the support frame 110 between the resting position and the loading position as discussed later in detail.

Further, as illustrated, the gate 118 is pivotally connected to the support frame 110 proximal to the front end 111 thereof. The gate 118 is operable to move between an open position and a closed position. Throughout the present disclosure, the term "gate" as used herein refers to an elongated arm like structure that can be electronically controlled to move between the open position and the closed position. Herein, open position of the gate 118 is a position of the gate 118 when a longitudinal length of the gate 118 is perpendicular to a plane of the support frame 110 in resting position thereof. Further, the closed position of the gate 118 is a position when the longitudinal length of the gate 118 is parallel to a plane of the support frame 110 in resting position. In the illustrated example of FIG. 1, the gate 118 is shown in open position thereof. In the illustrated example of FIG. 7, the gate 118 is shown in closed position thereof. Notably, the gate 118 is adapted to allow for receiving the trailer 106 on the support frame 110 in the open position thereof, and support the trailer 106 on the support frame 110 in the closed position thereof.

According to an embodiment, the gate 118 has a constrained end 118a and a free end 118b. The gate 118 is pivotally connected to one of the pair of first side beams 120A at the constrained end 118A thereof. Herein, the free end 118B of the gate 118 is received at the other first side beam 120B of the pair of first side beams 120A and 120B when the gate 118 is in the closed position thereof. Optionally, the first side beam 120B, that is adapted to receive the free end 118B of the gate 118, may have a locking mechanism, such as a clamp that is arranged to lock the free end 118B of the gate 118 to the first side beam 120B. It will be appreciated that the gate 118 is arranged to restrain the trailer 106 along with the container 102 within the loading space of the support frame 110 when the towing vehicle 104 is detached from the trailer 106 and driven away from the loading space.

Figure 5:
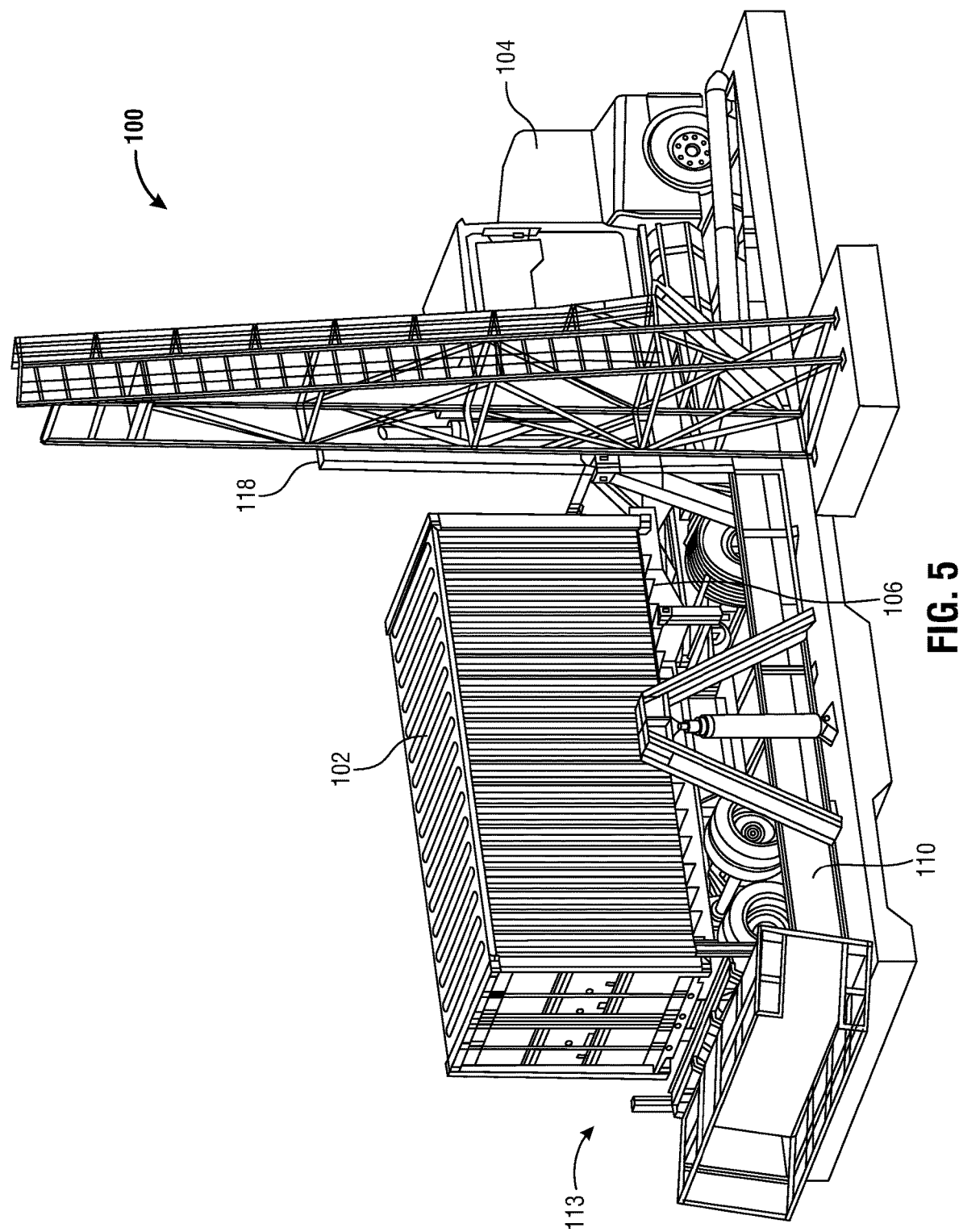

As discussed, the pair of first actuating cylinders 112A and 112B is supported on the platform 108. Each of the first actuating cylinders 112A and 112B having a first end 124A and a second end 124B. Herein, each of the first actuating cylinders 112A and 112B may be pivotally supported with respect to the platform 108 from the corresponding first end 124A and fixedly connected to the support frame 110 from the corresponding second end 124B. The first actuating cylinders 112A and 112B are connected to the support frame 110 proximal to the front end 111 of the support frame 110. As aforementioned, the support frame 110 includes the pair of first side beams 120A and 120B extending vertically from the support frame 110 proximal to the front end 111 thereof. Herein, specifically, each of the first actuating cylinders 120A and 120B is fixedly connected at the respective second end 124B to one of the pair of first side beams 120A and 120B. As may be seen, the pair of first side beams 120A and 120B are arranged proximal to the front end 111 of the support frame 110 such that when the container 102 with the trailer 106 is driven in the loading space of the support frame 110, the pair of first actuating cylinders 120A and 120B exert a force on a door side 102A (as shown in FIG. 5) of the container 102.

Also, as discussed, the apparatus 100 further includes the pair of pivoting arms 116A and 116B. Herein, each of the pivoting arms 116A and 116B has a first end 126A and a second end 126B. Further, each of the pivoting arms 116A and 116B are pivotally connected to the platform 108 from the corresponding first end 126A proximal to the front end 111 of the support frame 110 and pivotally connected to one of the pair of first actuating cylinders 112A and 112B from the corresponding second end 126B at the first end 124A of the respective first actuating cylinder 112A and 112B.

Further, as discussed, the pair of second actuating cylinders 114A and 114B is supported on the platform 108. Each of the second actuating cylinders 114A and 114B has a first end 128A and a second end 128B. Herein, each of the second actuating cylinders 114A and 114B are pivotally connected to the platform 108 from the corresponding first end 128 and fixedly connected to the support frame 110 from the corresponding second end 128B. The second actuating cylinders 114A and 114B are connected to the support frame 110 proximal to the rear end 113 of the support frame 110. As aforementioned, the support frame 110 includes the pair of second side beams 122A and 122B extending vertically from the support frame 110 proximal to the rear end 113 thereof. Herein, specifically, each of the second actuating cylinders 114A and 114B is fixedly connected at the respective second end 128B to one of the pair of second side beams 122A and 122B. As discussed, each of the pair of second side beams 122A and 122B is A-shaped. As may be seen in FIG. 1, each of the pair of first actuating cylinders 114A and 114B are fixedly attached at respective second end 128B to an apex of the corresponding A-shaped second side beams 122A and 122B. Beneficially, the pair of second side beams 122A and 122B are arranged proximal to the rear end 113 of the support frame 110 such that when the trailer 106 with the container 102 is driven in the loading space, the second pair of actuating cylinders 114A and 114B exert a force to cause the support frame 110 to lift to cause the container 102 to tilt exposing the door at the door side 102A thereof.

Throughout the present disclosure, the term "actuating cylinders" as used in "first actuating cylinders 112A and 112B" and "second actuating cylinders 114A and 114B" refer to cylinder and piston arrangement in which hydraulic or pneumatic pressure or electric power is converted into mechanical force for moving an object from one position to another. It will be appreciated that such actuating cylinders are known in the art. Typically, actuating cylinders comprise cylinder housing, one or more pistons and piston rods, and one or more seals. The cylinder housing has a polished bore where the piston operates, and one or more other ports allowing fluid to enter and exit the bore. The piston and rod form an assembly where the piston moves forward and back within the bore while the rod moves in and out of an opening in the housing. The seals are used in various places to prevent leakages.

In the embodiments of the present disclosure, the pair of first actuating cylinders 112A and 112B is compressed and the pair of second actuating cylinders 114A and 114B is extended to move the support frame 110 from the resting position to the loading position. Further, the pair of first actuating cylinders 112A and 112B is extended and the pair of second actuating cylinders 114A and 114B is compressed to move the support frame 110 from the loading position to the resting position.

According to an embodiment, the apparatus 100 further includes a securing member (not shown) configured to lash the trailer 106 to the support frame 110. Herein, the trailer 106 along with the container 102 is lashed to the pair of second side beams 122A and 122B using the securing member in order to secure it in a particular position in the loading space of the support frame 110. In another example, the securing member may secure wheels of the trailer 106 such that the trailer 106 along with the container 102 are not displaced form the support frame 110 when tilted into the loading position. Herein, the securing member includes one or more of chain ratchets, ropes, wires, cables or a combination thereof.

According to an embodiment, the apparatus 100 further includes an accessing arrangement 129 to provide access to the door side 102A of the container 102 when the support frame 110 is in the loading position thereof. Herein, the accessing arrangement 129 includes a ladder structure 130 having a ramp 131. The ladder structure 130 is arranged on the platform 108. Further, the accessing arrangement 129 includes a walkway structure 132 having a ramp 133. The walkway structure 132 is provided at the rear end 113 of the support frame 110. When the support frame 110 is in the loading position thereof, the ramp 131 of the ladder structure 130 and the ramp 133 of the walk away structure 132 are substantially aligned to form an access platform for an operator to stand thereat and access the door side 102A of the container 102. In one or more embodiments, the apparatus further includes a ramp panel 138 (as better shown in FIG. 12) provided with the walkway structure 132 to allow the operator standing thereon to get a closer access to the door side 102A of the container 102.

Referring to FIG. 2, illustrated is diagrammatic exploded view of a section of the apparatus 100 of FIG. 1 depicting arrangement of the pair of first actuating cylinders 112A and 112B and the gate 118 relative to the pair of first side beams 120A and 120B, in accordance with an embodiment of the present disclosure. As shown, the pair of first side beams 120A and 120B are supported on an end bridge section 202 which has a cylindrical pivot 204 mounted thereon. Each of the pair of pivoting arms 116A and 116B is respectively connected to the corresponding cylindrical pivot 204 at the respective first end 126A and to the respective one of the pair of first actuating cylinders 112A and 112B at the second end 112B thereof. Further, the cylindrical pivot 204 is connected to a pivot bearing 206 which, in turn, is connected to a bearing adjustor 208 via a pivot shaft collar 210.

Referring to FIG. 3, illustrated is flowchart listing steps 302-310 of a method 300 for operating the apparatus 100 of FIG. 1 for loading of the container, in accordance with an embodiment of the present disclosure. Further, referring to FIGS. 4 to 17 illustrated are various stages involved in loading of the container using the apparatus of FIG. 1, in accordance with various embodiments of the present disclosure. Notably, the various stages involved in loading of the container 102 are depicted in FIGS. 4 to 17 which are explained in greater detail herein in conjunction with corresponding steps of the method 300.

At step 302, the trailer 106 with the container 102 mounted thereon is received. Herein, the trailer 106 is engaged to and driven by the vehicle 104 in the reverse directions, onto the support frame. As depicted in FIG. 4, the trailer 106 with the container 102 mounted thereon is received in the loading space of the support frame 110. Herein, the trailer 106 is engaged to and driven by the vehicle 104 in the reverse direction. As shown, the trailer 106 with the container 102 is driven onto the support frame 110. Herein, the gate 118 is disposed in the open position to allow for receiving the trailer 106 along with the container 102. Thereafter, as depicted in FIG. 5, the vehicle 104 is driven backwards until the trailer 106 is positioned at the rear end 113 of the support frame 110. In the illustrated FIGS. 4 and 5, the support frame 110 is the resting position thereof.

Figure 6:
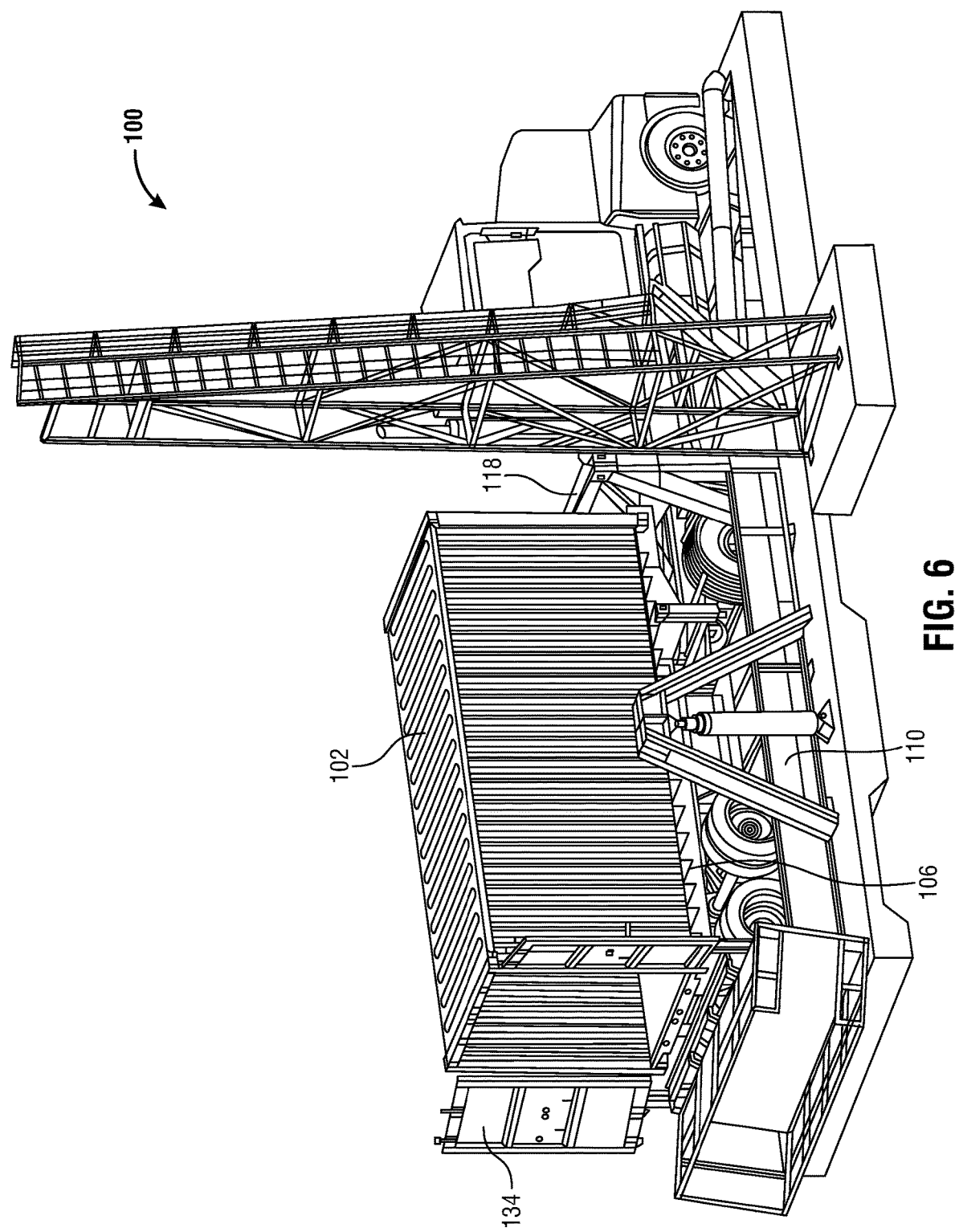
Figure 7:
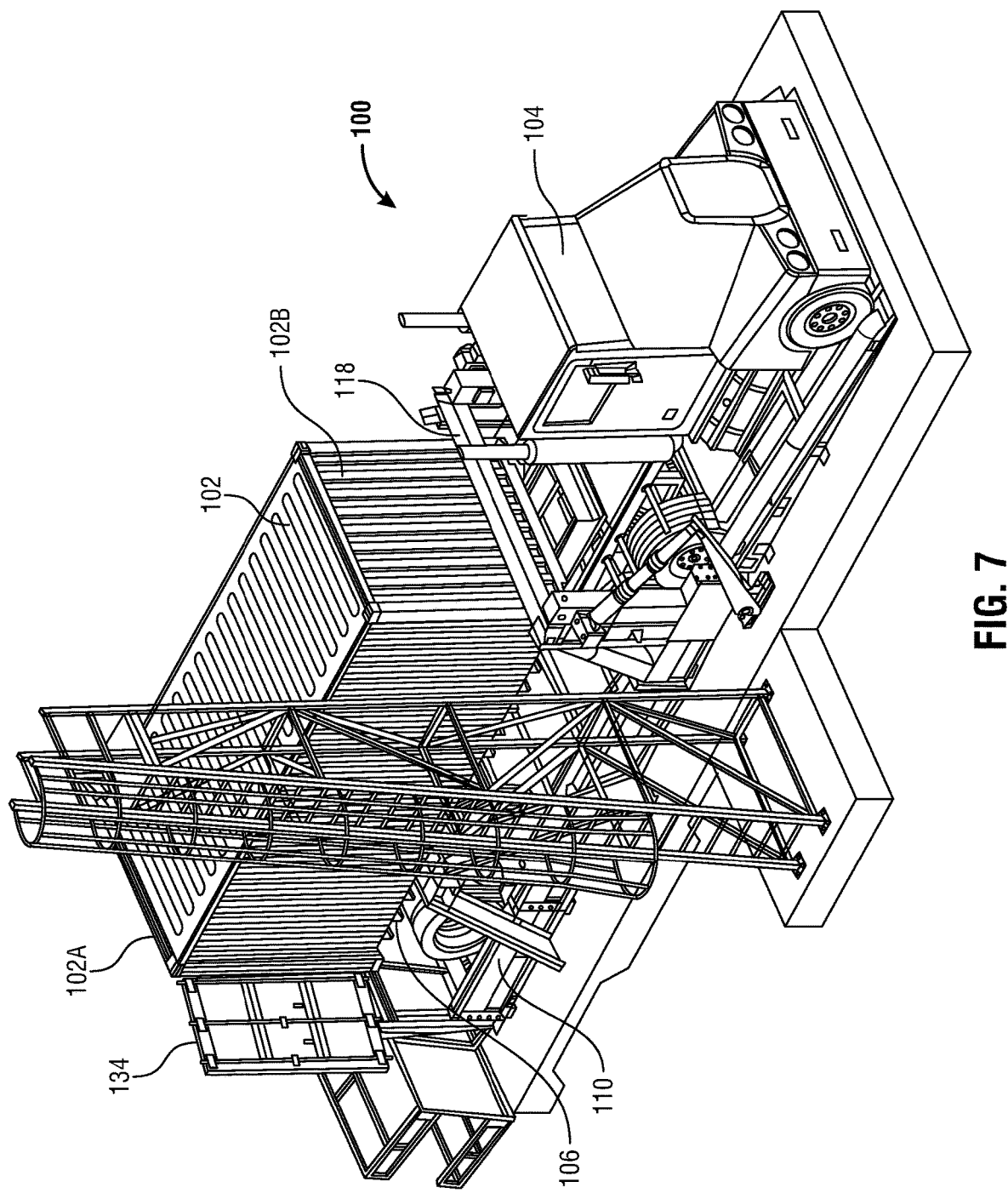
Figure 8:
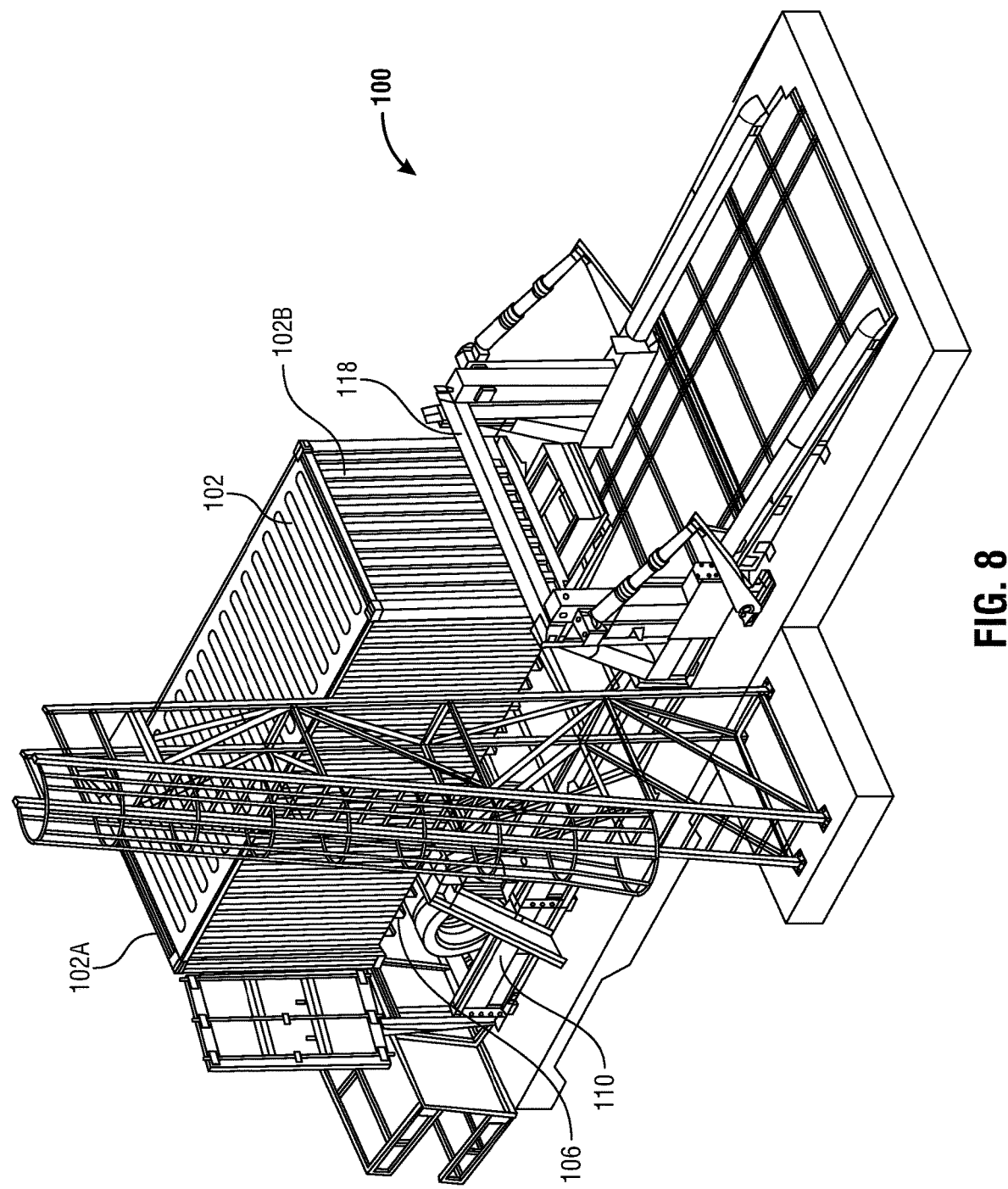

At step 304, the gate 118 is moved to the closed position thereof such that the trailer 106 is supported on the support frame 110, with the container 102 abutting the gate 118. Herein, the vehicle 104 is moved backward on the platform 104 and the trailer is disengaged there from. As depicted in FIG. 6, the gate 118 is moved to the closed position thereof such that the trailer 106 is supported on the support frame 110 with the container 102 abutting the gate 118 at the front side 102B thereof. Further, doors 134 of the container 102 are opened, manually or using a hydraulic opening and closing system, when the support frame 110 is in the resting position. Further, the trailer 106 is lashed to the support frame 110 using securing members. Thereafter as depicted in FIG. 7, the vehicle 104 is moved forwards such that the front side 102B of the container 102 is abutted against the gate 118. As the vehicle 104 moves forward, the trailer 106 is removed from the vehicle 104 as once the trailer 106 is secured to the support frame 110 and disengaged from the vehicle 104. That is, the vehicle 104 is disengaged from the trailer 106 and driven forward to disembark the vehicle from the support frame 110. Further, as depicted in FIG. 8, the container 102 is left engaged with the support frame 110.

Figure 9:
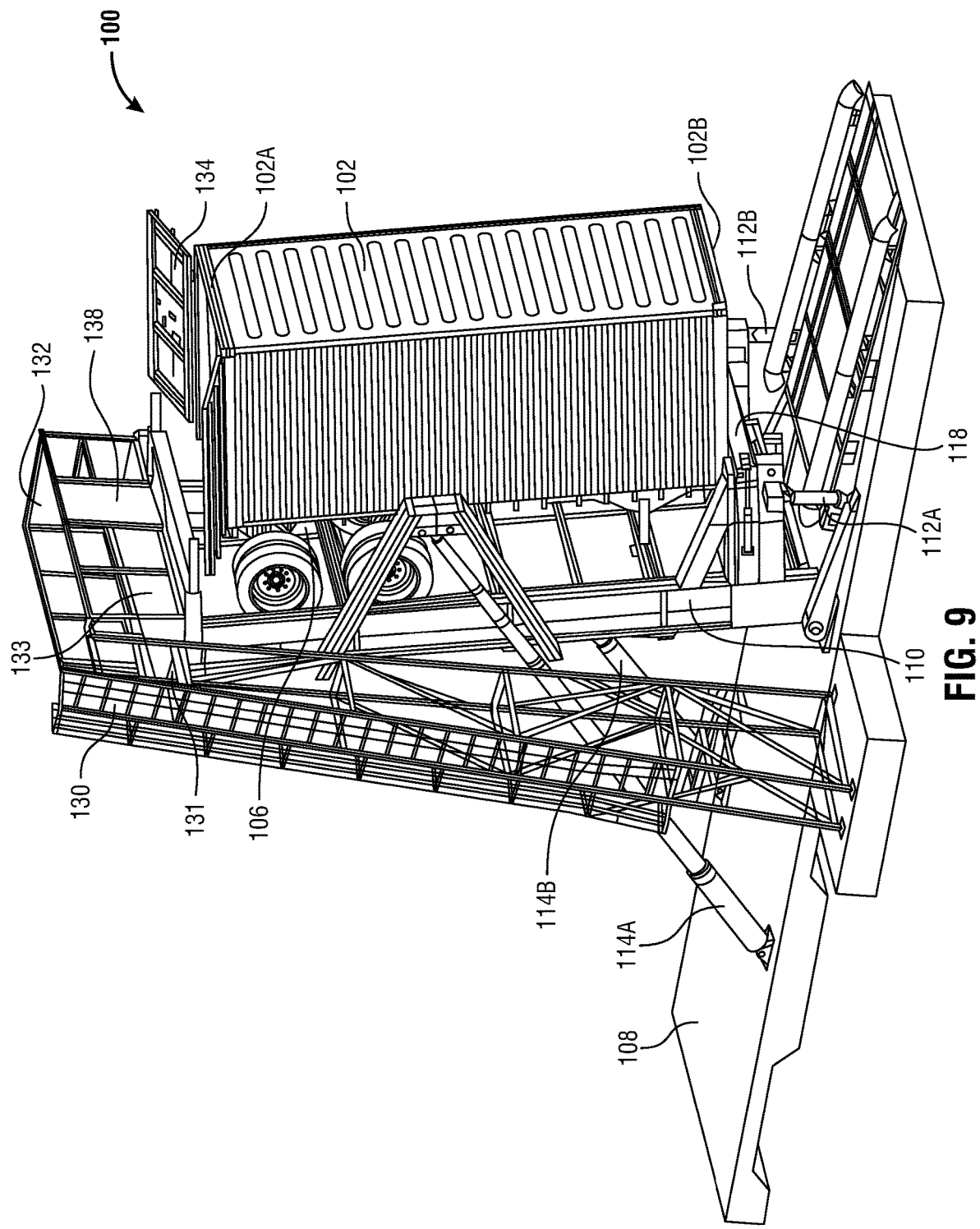
Figure 10:
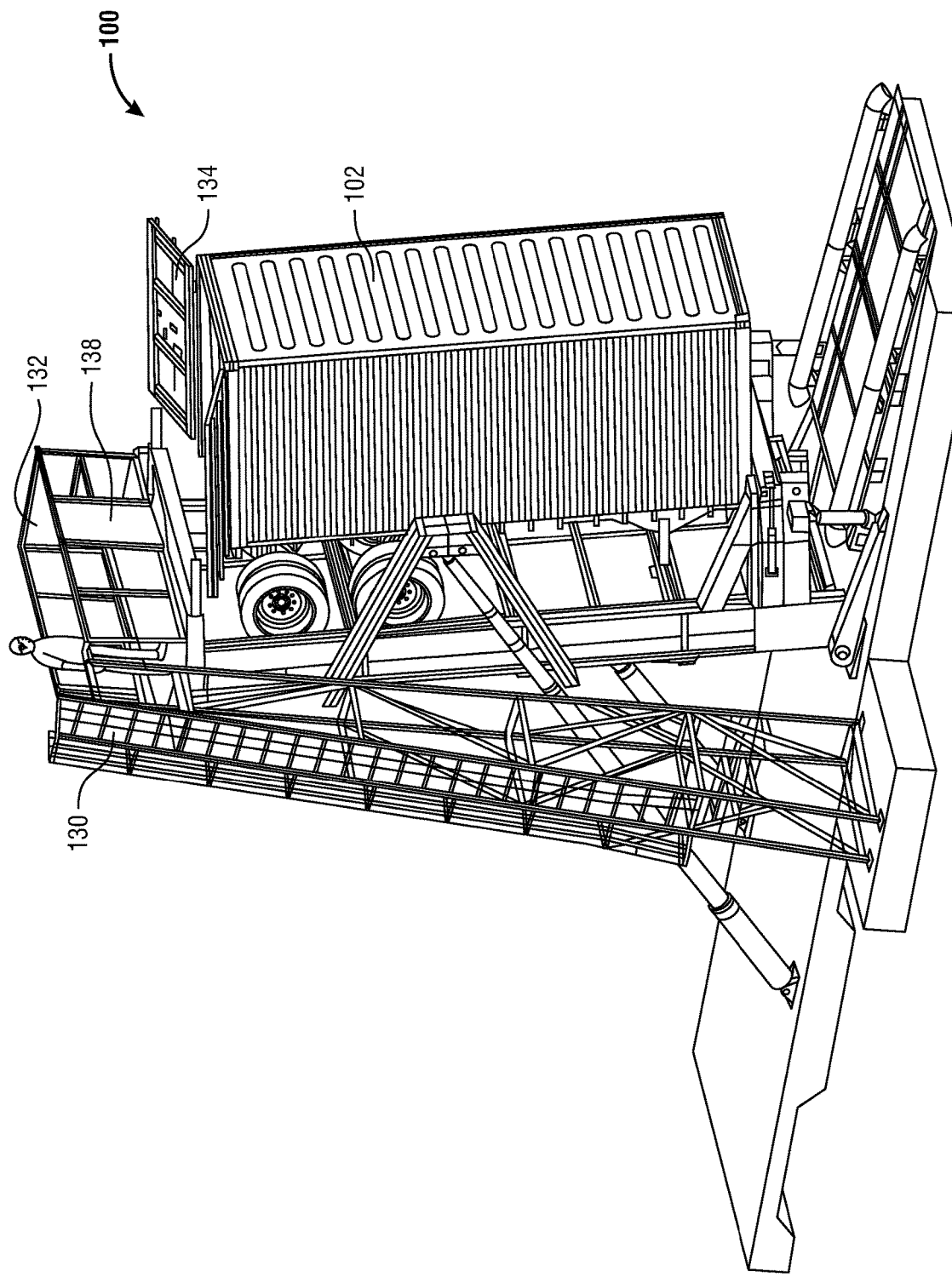

At step 306, the pair of first actuating cylinders 112A and 112B is compressed and the pair of second actuating cylinders 114A and 114B is extended to move the support frame 110 from the resting position to the loading position thereof to be disposed at an angle with respect to the platform 108 with the received trailer 106 being tilted. As depicted in FIG. 9, the pair of first actuating cylinders 112A and 112B is compressed and the pair of second actuating cylinders 114A and 114B is extended and the support frame 110 is moved to the loading position thereof to be disposed at an angle with respect to the platform 108. Further, the received trailer 106 along with the container 102 is tilted. Herein, the support frame 110 is at an angle of about 80 degrees with respect to the platform 108. Furthermore, when in the loading position, the ramp 133 of the walkway structure 132 is aligned with the ramp 131 of the ladder structure 130 in order to provide access to the doors 134 of the container 102 to perform the loading operation.

Figure 11:
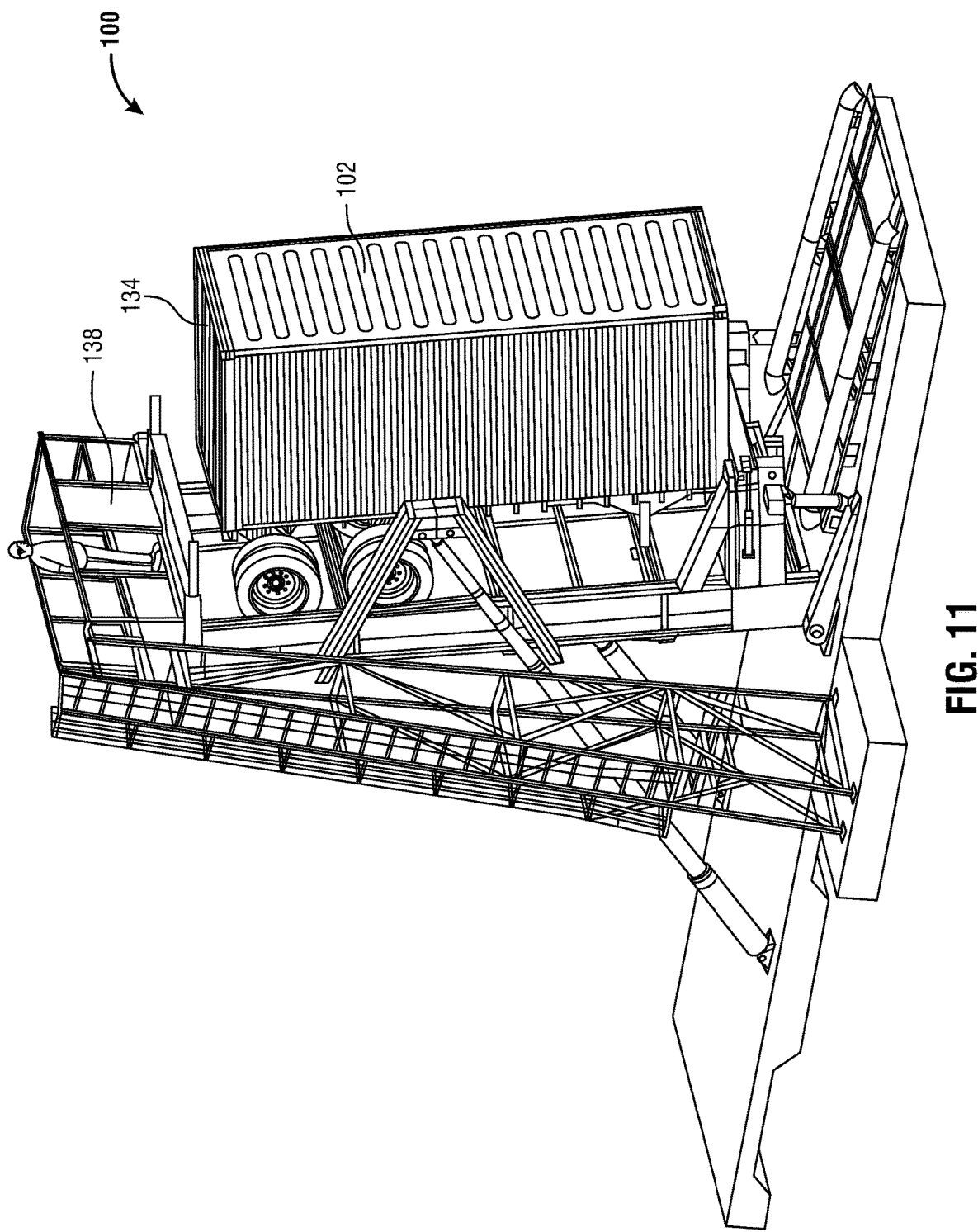
Figure 12:
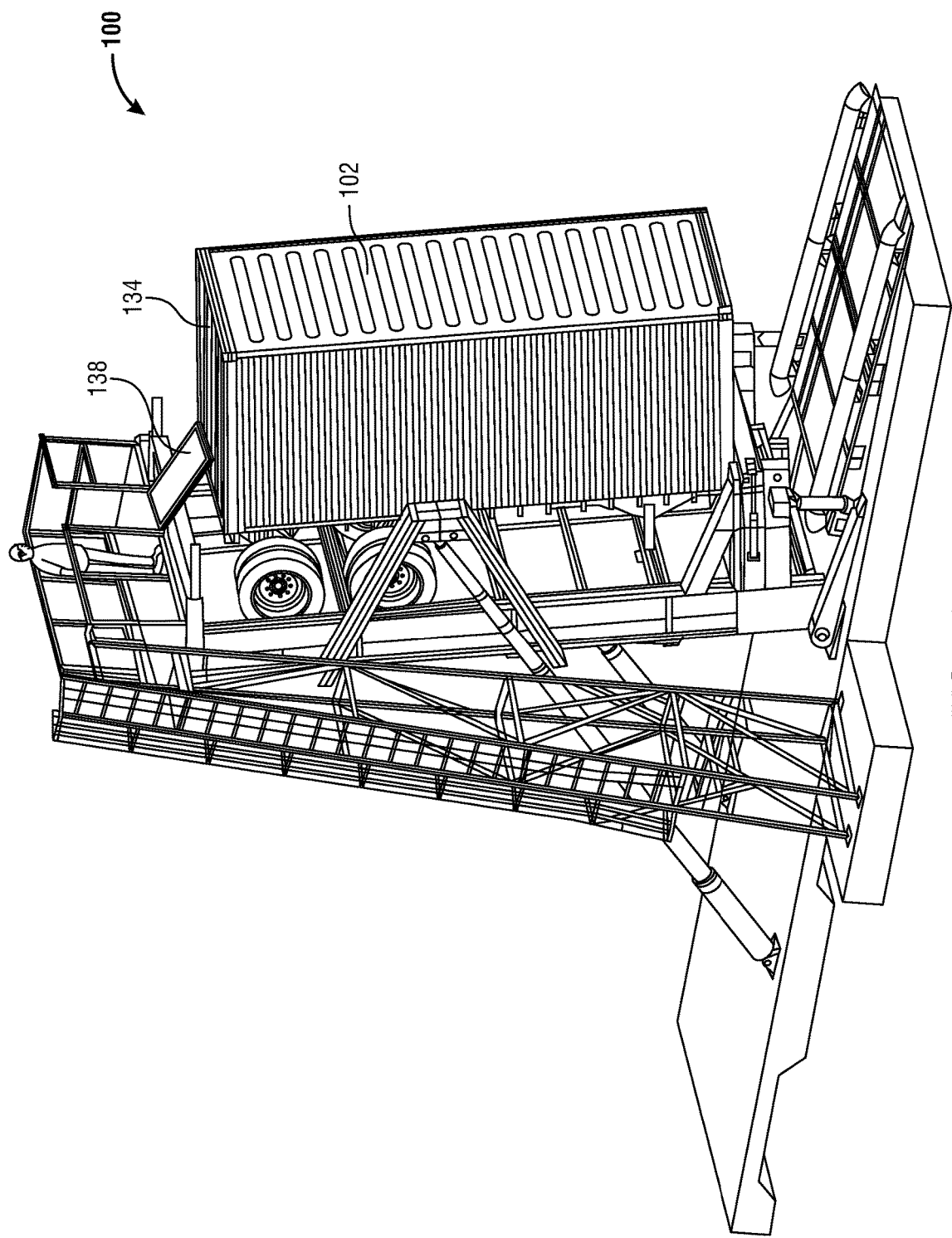

At step 308, access to the door side 102A of the container 102 is provided when the support frame 110 is in the loading position thereof for performing loading of the container 102. As may be seen in FIG. 10, the operator ascends the ladder structure 130 and moves to the walk away structure 132 to perform the loading operation by accessing the door side 102A of the container 102. Thereafter, as depicted in FIG. 11, the doors 134 of the container 102 are closed when the loading operation is complete. For this purpose, as shown in FIG. 12, the ramp panel 138 is extended to enhance access to the door side 102A of the container 102. Herein, the ramp panel 138 allows the operator to manually lash the doors 134 of the container 102.

Figure 13:
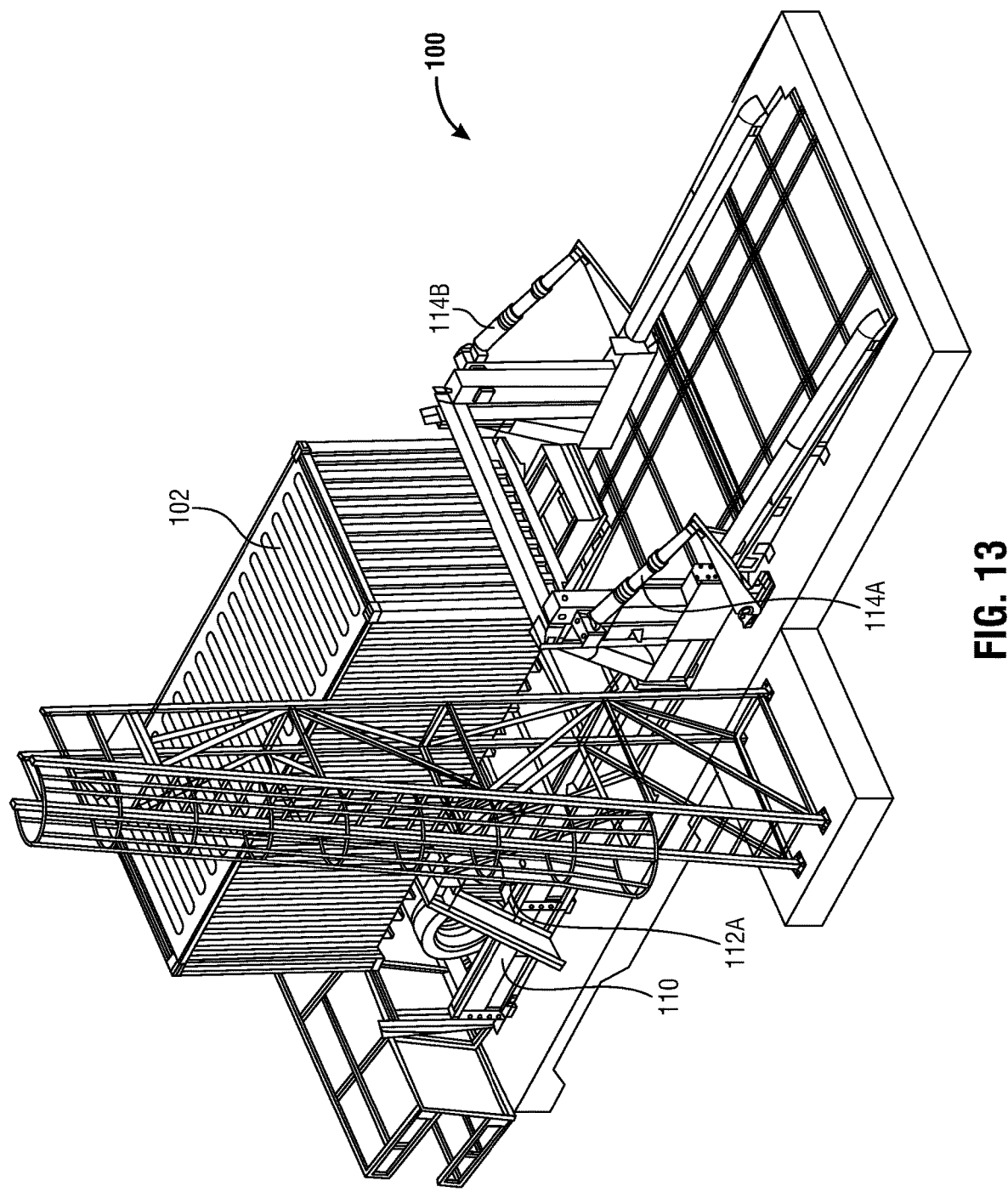

At step 310, the pair of first actuating cylinders 112A and 112B is extended and the pair of second actuating cylinders 114A and 114B is compressed to move the support frame 110 from the loading position back to the resting position thereof. As depicted in FIG. 13, each of the pair of first actuating cylinders 112A and 112B is extended and the pair of second actuating cylinders 114A and 114B is compressed to move the support frame 110 from the loading position back to the resting position.

Figure 14:
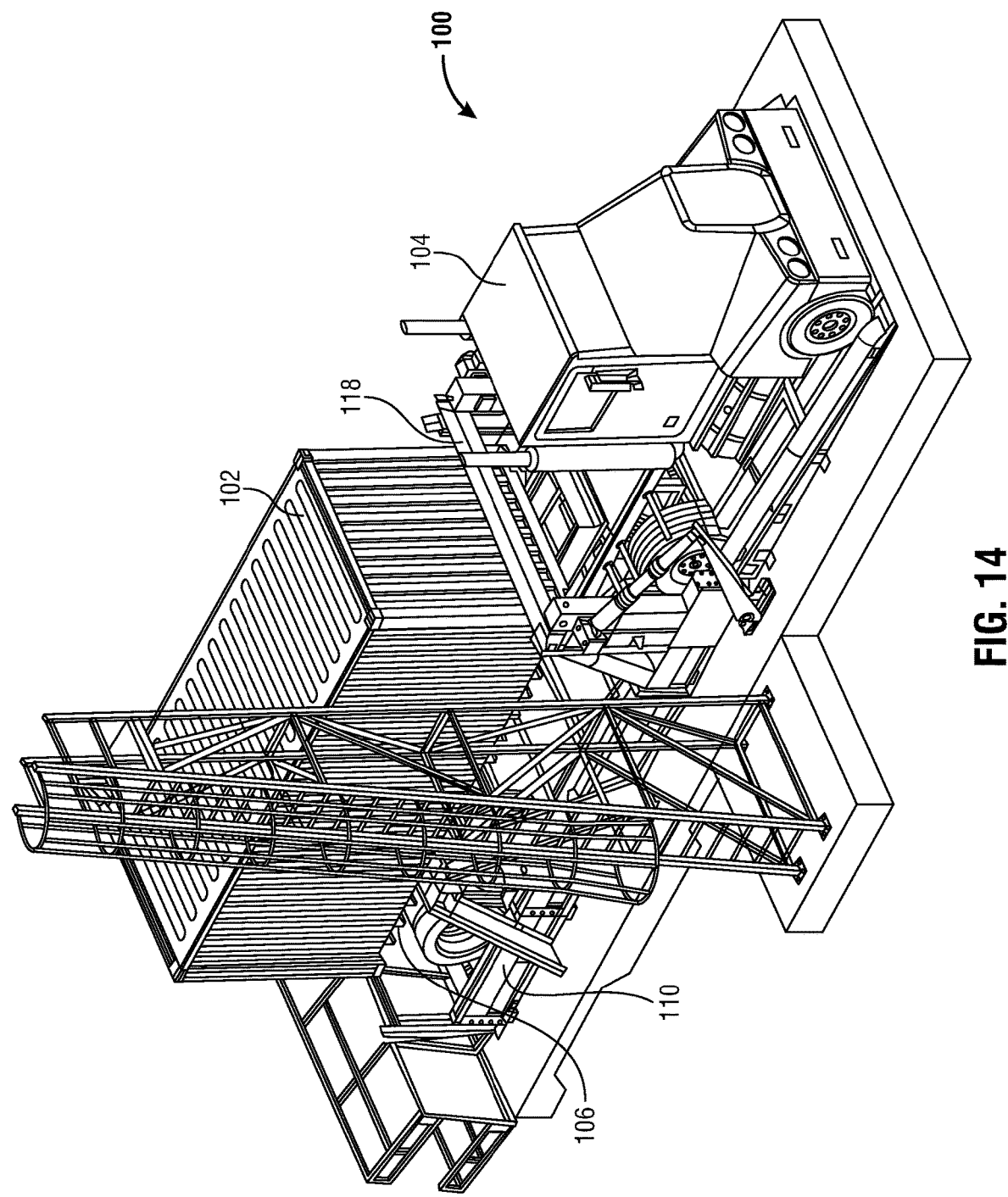
Figure 15:
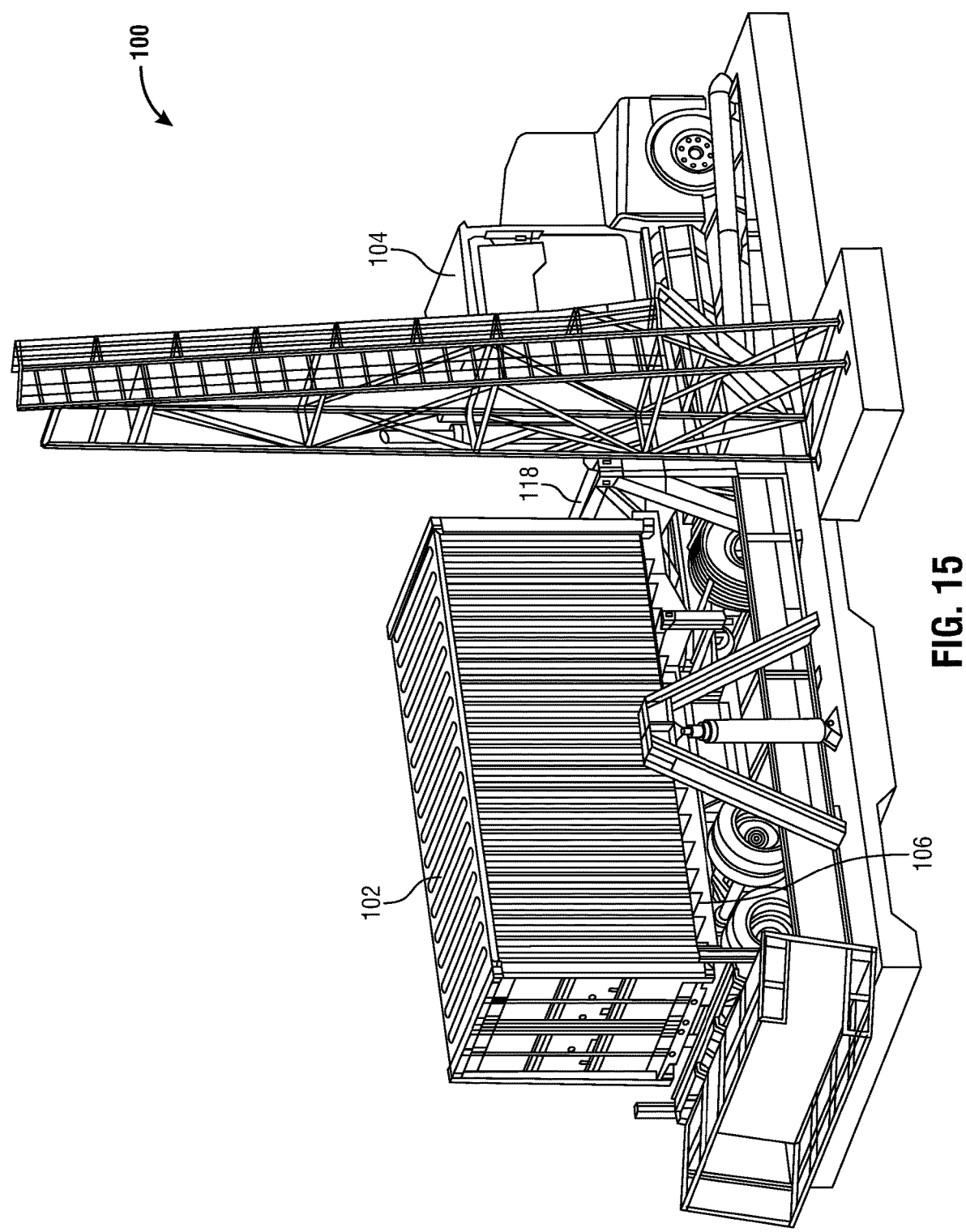
Figure 16:
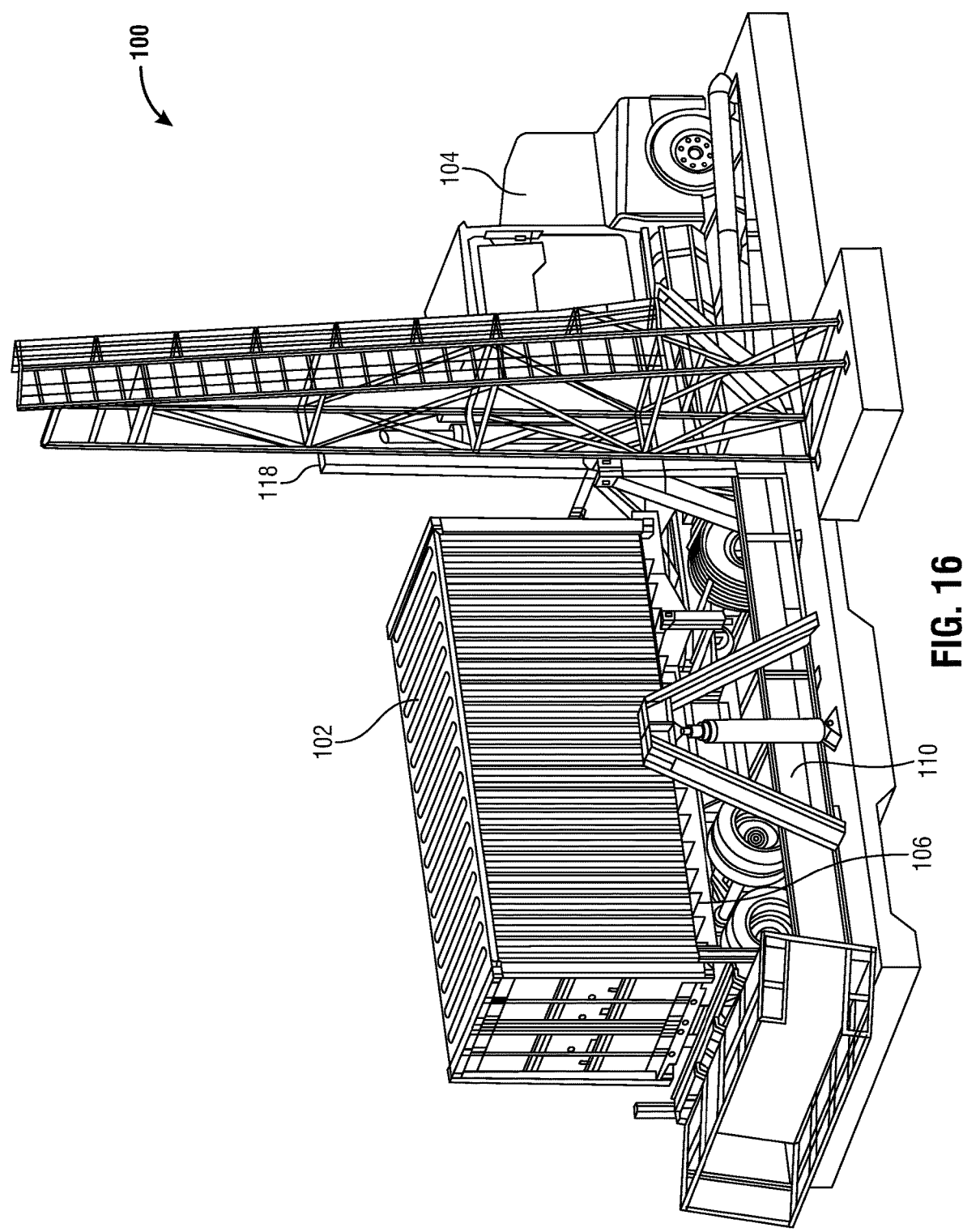
Figure 17:
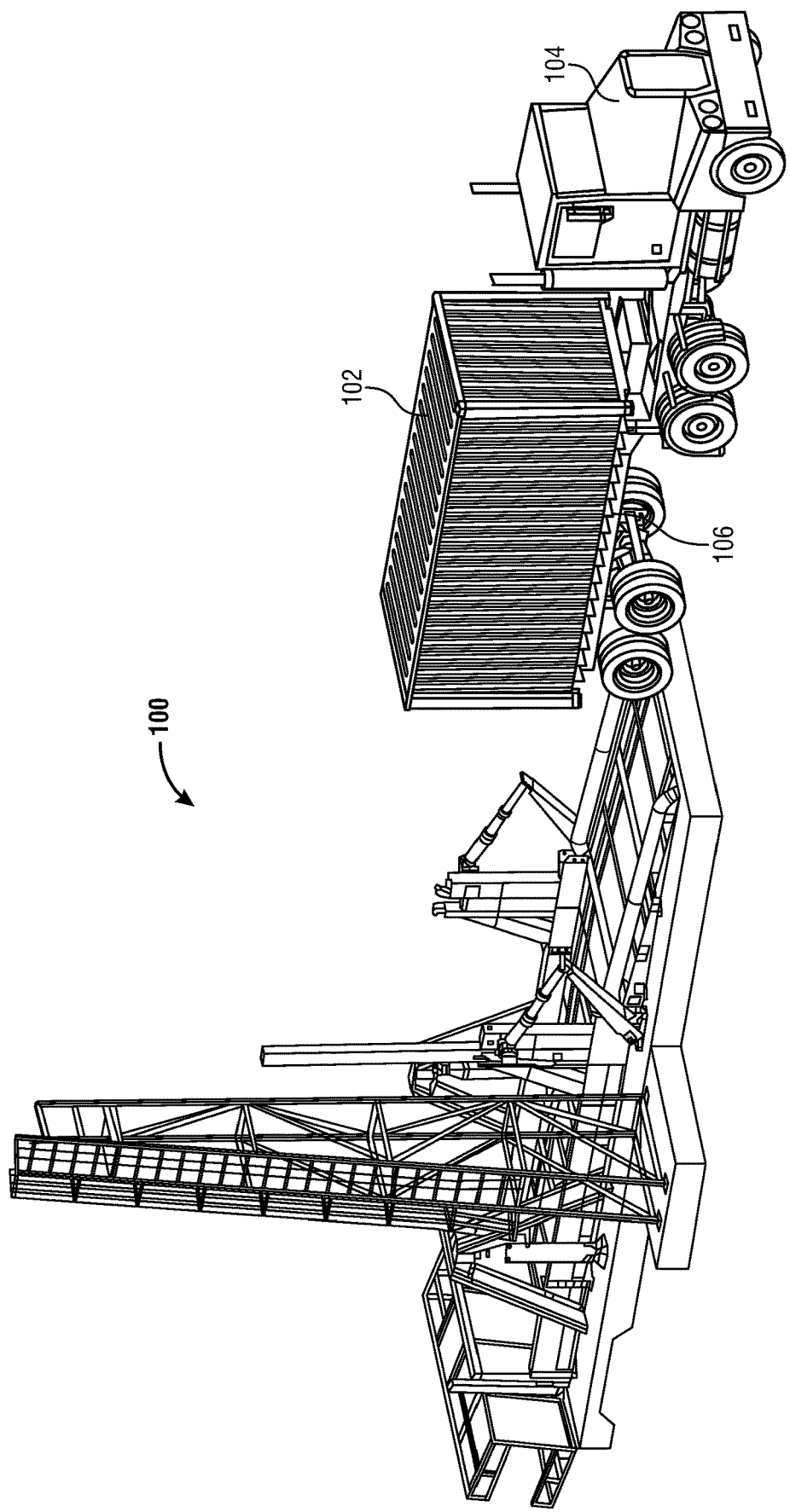

Thereafter, as depicted in FIG. 14, the trailer 106 is re-engaged with the vehicle 104. Further, the trailer 106 is unlashed from the support frame 110 to enable the trailer 106 and the container 102 mounted thereon to be removed from the support frame 110, when the vehicle 104 is driven in the forward direction with the trailer 106 engaged therewith. Further, as may be seen from FIG. 15, the trailer 106 is moved slightly backwards to take off the load from the gate 118. Thereafter, as depicted in FIG. 16, the gate 118 is moved to the open position thereof such that the trailer 106 with the container 102 is allowed to be removed from the support frame 110, when the vehicle 104 is moved forward on the platform 108 with the trailer 106 engaged therewith. Thereafter, as depicted in FIG. 17, the vehicle 104 is driven in the forward direction with the trailer 106 engaged therewith and the loaded container 102 mounted on the trailer 106, to be transported away from the apparatus 100.

The apparatus 100 and the method 300 with the operation sequence as depicted in FIGS. 4-17 provide a convenient, efficient and faster means for loading of the container 102. The apparatus of the present invention provides a robust design by eliminating the need for disengaging the container from the trailer to perform the loading operation, as in conventional systems, thereby mitigating the alignment issues that occur during the mounting and demounting of the container. Additionally, this also enhances the longevity of the container as it eliminates hampering of the container in case of uneven mass distribution of goods. Moreover, as the container is mounted on the trailer at all times, it can be quickly removed from the apparatus after loading, thus giving way for the next container in line. Hence, it reduces the total time taken and makes the process more efficient.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. An apparatus for tilting a container for loading thereof, the apparatus comprising:
   a platform;
   a support frame having a front end and a rear end, the support frame being pivotally connected to the platform at the front end thereof to move between a resting position and a loading position, the support frame being generally parallel to the platform and adapted to receive a trailer with the container mounted thereon in the resting position thereof, and the support frame being disposed at an angle with respect to the platform to tilt the received trailer in the loading position thereof;
   a gate pivotally connected to the support frame proximal to the front end thereof, the gate being operable to move between an open position and a closed position, with the gate being adapted to allow for receiving the trailer on the support frame in the open position thereof and to support the trailer on the support frame in the closed position thereof; and
   a pair of first actuating cylinders with each of the first actuating cylinders having a first end and a second end, each of the first actuating cylinders being pivotally supported with respect to the platform from the corresponding first end and pivotally connected to the support frame from the corresponding second end, proximal to the front end of the support frame; and
   a pair of second actuating cylinders with each of the second actuating cylinders having a first end and a second end, each of the second actuating cylinders being pivotally connected to the platform from the corresponding first end and pivotally connected to the support frame from the corresponding second end, proximal to the rear end of the support frame,
   wherein the pair of first actuating cylinders are compressed and the pair of second actuating cylinders are extended to move the support frame from the resting position to the loading position.

2. The apparatus according to claim 1 further comprising a pair of pivoting arms with each of the pivoting arms having a first end and a second end, each of the pivoting arms being pivotally connected to the platform from the corresponding first end proximal to the front end of the support frame and pivotally connected to one of the pair of first actuating cylinders from the corresponding second end at the first end of the respective first actuating cylinder.

3. The apparatus according to claim 1, wherein the support frame includes a pair of first side beams extending vertically from the support frame proximal to the front end thereof, and wherein each of the first actuating cylinders is pivotally connected at the respective second end to one of the pair of first side beams.

4. The apparatus according to claim 3, wherein the gate has a constrained end and a free end, the gate being pivotally connected to one of the pair of first side beams at the constrained end thereof, such that the free end of the gate is received at other first side beam of the pair of first side beams when the gate is in the closed position thereof.

5. The apparatus according to claim 1, wherein the support frame includes a pair of second side beams extending vertically from the support frame proximal to the rear end thereof, and wherein each of the second actuating cylinders is pivotally connected at the respective second end to one of the pair of second side beams.

6. The apparatus according to claim 5, wherein each of the pair of second side beams is substantially A-shaped.

7. The apparatus according to claim 1 further comprising a securing member configured to lash the trailer to the support frame.

8. The apparatus according to claim 7, wherein the securing member comprises one or more of chain ratchets, ropes, wires, cables or a combination thereof.

9. The apparatus according to claim 1 further comprising an accessing arrangement to provide access to a door side of the container when the support frame is in the loading position thereof.

10. The apparatus according to claim 9, wherein the accessing arrangement comprises:
a ladder structure having a ramp and arranged on the platform; and
a walkway structure having a ramp and provided at the rear end of the support frame,
wherein, when the support frame is in the loading position thereof, the ramp of the ladder structure and the ramp of the walk away structure are substantially aligned to form an access platform for an operator to stand thereat and access the door side of the container.

11. The apparatus according to claim 10 further comprising a ramp panel provided with the walkway structure to allow the operator standing thereon to get a closer access to the door side of the container.

12. The apparatus according to claim 1, wherein the support frame is disposed at the angle in the range of 75 to 85 degrees with respect to the platform in the loading position thereof.

13. A method for tilting a container for loading thereof, the method comprising:
providing a support frame pivotally mounted to a platform, to be moved between a resting position and a loading position thereof;
providing a gate pivotally connected to the support frame, to be moved between an open position and a closed position thereof;
providing a pair of first actuating cylinders with each of the first actuating cylinders being pivotally supported with respect to the platform and pivotally connected to the support frame;
providing a pair of second actuating cylinders with each of the second actuating cylinders being pivotally connected to the platform and pivotally connected to the support frame;
receiving the trailer with the container mounted thereon, engaged to and driven by a vehicle in the reverse direction, onto the support frame;
moving the gate to the closed position thereof such that the trailer is supported on the support frame, with the container abutting the gate, when the vehicle is moved backward on the platform with the trailer disengaged therefrom;
compressing the pair of first actuating cylinders and extending the pair of second actuating cylinders to move the support frame from the resting position to the loading position thereof to be disposed at an angle with respect to the platform with the received trailer being tilted;
providing access to a door side of the container when the support frame is in the loading position thereof for performing loading of the container; and
extending the pair of first actuating cylinders and compressing the pair of second actuating cylinders to move the support frame from the loading position back to the resting position thereof.

14. The method according to claim 13 further comprising moving the gate to the open position thereof such that the trailer with the container is allowed to be removed from the support frame, when the vehicle is moved forward on the platform with the trailer engaged therewith.

15. The method according to claim 14 further comprising:
lashing the trailer to the support frame when received thereon; and
unlashing the trailer from the support frame to enable the trailer with the container to be removed from the support frame, when the vehicle is driven in the forward direction with the trailer engaged therewith.

16. The method according to claim 13 further comprising:
opening a door of the container when the support frame is in the resting position thereof; and
closing the door of the container when the support frame is in the loading position thereof after the loading of the container has been performed.

17. A method for operating the apparatus of claim 1 for loading of the container, the method comprising:
receiving the trailer with the container mounted thereon, engaged to and driven by a vehicle in the reverse direction, onto the support frame;
moving the gate to the closed position thereof such that the trailer is supported on the support frame, with the container abutting the gate, when the vehicle is moved backward on the platform with the trailer disengaged there from;
compressing the pair of first actuating cylinders and extending the pair of second actuating cylinders to move the support frame from the resting position to the loading position thereof to be disposed at an angle with respect to the platform with the received trailer being tilted;
providing access to a door side of the container when the support frame is in the loading position thereof for performing loading of the container; and
extending the pair of first actuating cylinders and compressing the pair of second actuating cylinders to move the support frame from the loading position back to the resting position thereof.

* * * * *